US008648556B2

(12) United States Patent
Lejeune et al.

(10) Patent No.: US 8,648,556 B2
(45) Date of Patent: Feb. 11, 2014

(54) DEVICE FOR CONTROL OF A PMSM

(75) Inventors: Guilhem Lejeune, Chatuzange le Goubet (FR); Sebastien Vieillard, La Chapelle Gauthier (FR)

(73) Assignee: Hispano Suiza, Colombes (FR)

( * ) Notice: Subject to any disclaimer, the term of this patent is extended or adjusted under 35 U.S.C. 154(b) by 38 days.

(21) Appl. No.: 13/513,362

(22) PCT Filed: Dec. 10, 2010

(86) PCT No.: PCT/EP2010/069406
§ 371 (c)(1),
(2), (4) Date: Jul. 20, 2012

(87) PCT Pub. No.: WO2011/070165
PCT Pub. Date: Jun. 16, 2011

(65) Prior Publication Data
US 2012/0280641 A1    Nov. 8, 2012

(30) Foreign Application Priority Data

Dec. 11, 2009   (FR) ..................................... 09 58879

(51) Int. Cl.
*H02P 6/16*      (2006.01)
*H02P 21/13*     (2006.01)
*H02P 23/14*     (2006.01)

(52) U.S. Cl.
USPC ...... 318/400.09; 318/490; 318/610; 318/721; 318/800

(58) Field of Classification Search
USPC ..................... 318/400.09, 490, 610, 721, 800
See application file for complete search history.

(56) References Cited

U.S. PATENT DOCUMENTS

| 4,777,422 | A  | * | 10/1988 | Slicker et al. | ................ | 318/800 |
| 5,969,499 | A  | * | 10/1999 | Shaffer | ........................ | 318/801 |
| 6,172,498 | B1 | * | 1/2001 | Schmidt et al. | .......... | 324/207.12 |
| 7,002,318 | B1 | * | 2/2006 | Schulz et al. | ................. | 318/782 |
| 7,492,118 | B2 | * | 2/2009 | Burgstahler et al. | .......... | 318/721 |
| 7,888,893 | B2 | * | 2/2011 | Nagura et al. | ................ | 318/135 |

(Continued)

FOREIGN PATENT DOCUMENTS

JP        2001-112282 A       4/2001

OTHER PUBLICATIONS

International Search Report and Written Opinion issued Jul. 7, 2011 in PCT/EP2010/069406 with English language translation.

(Continued)

*Primary Examiner* — Paul Ip
(74) *Attorney, Agent, or Firm* — Oblon, Spivak, McClelland, Maier & Neustadt, L.L.P.

(57) ABSTRACT

A permanent magnet synchronous machine (PMSM) includes a stator and rotor powered by an inverter. A device to control the PMSM includes a sensor to sample a measurement $\theta_m$ of the position of the rotor, a control unit to control an operating point of the PMSM according to the position of the rotor and settings, and an estimation unit to determine an estimate $\hat{\theta}$ of the rotor position. The device also includes a malfunction detector to detect a malfunction of the sensor and a switch to connect the control unit to the sensor so that the control unit receives the measured position $\theta_m$ of the rotor while the malfunction detector does not indicate any sensor malfunction, and otherwise to connect the control unit to the estimation unit so that the control unit receives the estimated position $\hat{\theta}$ of the rotor when the malfunction detector indicates a sensor malfunction.

12 Claims, 7 Drawing Sheets

(56) References Cited

U.S. PATENT DOCUMENTS

| | | | |
|---|---|---|---|
| 8,248,039 B2 * | 8/2012 | Cao et al. | 322/37 |
| 8,253,365 B2 * | 8/2012 | Yeh | 318/490 |
| 2005/0140324 A1 * | 6/2005 | Kunzel et al. | 318/610 |
| 2006/0043921 A1 * | 3/2006 | Nagura et al. | 318/700 |
| 2008/0106230 A1 * | 5/2008 | Burgstahler et al. | 318/721 |
| 2010/0181945 A1 * | 7/2010 | Nagura et al. | 318/135 |
| 2010/0327585 A1 * | 12/2010 | Cao et al. | 290/44 |
| 2011/0089882 A1 * | 4/2011 | Yeh | 318/490 |

OTHER PUBLICATIONS

Babak Nahid-Mobarakeh, et al., "Analyse de convergence des lois de commande sans capteur des MSAP fondées sur l'estimation de la fém", RS-RIGE, vol. 6, No. 5, 2003, pp. 547-577 with partial English translation.

* cited by examiner

DEVICE FOR CONTROL OF A PMSM

TECHNICAL FIELD

The present invention concerns the field of control of permanent magnet synchronous machines (PMSM).

STATE OF THE PRIOR ART

A permanent magnet synchronous machine (PMSM) includes a stator and a rotor. Generally, the stator includes windings connected in a star shape and the rotor includes permanent magnets.

A PMSM is habitually powered by an inverter which enables the currents' ripple factor and torque of the machine to be reduced.

A PMSM has a high torque and very low inertia. In addition, it has relatively low inductances, which leads to fast responses of the currents and therefore of the torque.

It is therefore very advantageous to use PMSMs in the motor of high-power and high-performance actuators, notably in on-board aircraft systems.

FIG. 5 represents diagrammatically a system including a control device 101, an inverter 111 and a PMSM 103.

Inverter 111 powers PMSM 103 using direct voltage. It enables amplitude and frequency voltages which can be adjusted by control device 101 to be imposed on the terminals of PMSM 103.

Control device 101 is configured to control vectorially the voltages of inverter 111 using electrical feedback data 106, and above all a precise indication of position θ of the rotor. This information habitually originates from a position or speed sensor positioned on the shaft of the machine.

However, there are also sensorless PMSM control devices (see, for example, the publication of Babak Nahid-Mobarakeh et al., entitled *"Analysis of convergence of sensorless control laws of PMSMs based on estimation of the emf,"* Revue Internationale de Génie Electrique [International Electrical Engineering Review], Article Vol 6/May 6, 2003- pp 547-577-doi:10.3166/rige.6.545-577).

It will be noted that the description concerning the device for sensorless control is essentially taken from the publication of Babak Nahid-Mobarakeh et al, above.

Generally, the electrical equations of a PMSM in a stationary frame of reference associated with the stator are described by:

$$\begin{bmatrix} v_a \\ v_b \\ v_c \end{bmatrix} = R \begin{bmatrix} i_a \\ i_b \\ i_c \end{bmatrix} + \frac{d}{dt} \begin{bmatrix} \psi_a \\ \psi_b \\ \psi_c \end{bmatrix}$$

where $v_a$, $v_b$, $v_c$ are the voltages of the stator phases, R is the resistance of the stator phases, $i_a$, $i_b$, $i_c$ are the currents of the stator phases, and $\psi_a$, $\psi_b$, $\psi_c$ are the fluxes through the stator windings.

The PMSM can also be modelled very simply in a rotating frame of reference associated with the rotor.

FIG. 6 illustrates a rotating frame of reference d-q associated with the rotor (called a Park frame of reference) including a direct axis Od and a quadrature axis Oq. Direct axis Od forms an angle θ relative to a stationary axis Oα associated with the stator. More specifically, angle θ designates the rotor position identified by its excitation axis Od.

By applying the Concordia transformation $T_{32}$ and the Park transformation to the system of equations above the electrical equations in Park frame of reference d-q can be expressed as follows:

$$v_d = Ri_d + L\frac{di_d}{dt} - p\Omega L i_q + e_d$$

$$v_q = Ri_q + L\frac{di_q}{dt} - p\Omega L i_d + e_q$$

where $v_d$, $v_q$ and $i_d$, $i_q$ are the direct and quadrature voltage and current components, L is the stator inductance, Ω is the speed of rotation of the rotor (i.e. the angular speed of frame of reference d-q), p is the number of pairs of poles of permanent magnets of the rotor, and $e_d$, $e_q$ are the "emf" electromotive force components in frame of reference d-q defined by the following relationships:

$$e_d = 0$$

$$e_q = p\Omega\psi_f$$

where $\psi_f$ is the flux of the magnets through the direct equivalent circuit.

Given that the position of rotor θ and angular speed Ω are not measured, frame of reference d-q cannot be located, and the components of the electrical magnitudes in this frame of reference are unknown.

Habitually, to resolve this problem, a rotating estimated frame of reference δ-γ is defined, the position $\vartheta$ and speed $\Omega_c$ of which are known. Axis Oδ of estimated frame of reference δ-γ forms an angle $\vartheta$ relative to stationary axis Oα and an angle φ relative to axis Od. Angle φ indicates the displacement between axes Oδ and Od.

The problem of sensorless vector control then consists in determining angular speed $\Omega_c$ such that the difference of position φ between $\vartheta$ and θ is cancelled out.

The electrical equations of the PMSM in estimated frame of reference δ-γ can then be written as follows:

$$v_\delta = Ri_\delta + L\frac{di_\delta}{dt} - p\Omega_c L i_\gamma + e_\delta$$

$$v_\gamma = Ri_\gamma + L\frac{di_\gamma}{dt} - p\Omega_c L i_\delta + e_\gamma$$

where $v_\delta$, $v_\gamma$, and $i_\delta$, $i_\gamma$ are the voltage and current components in frame of reference δ-γ, $\Omega_c$ the angular speed of frame of reference δ-γ, and $e_\delta$, $e_\gamma$ the components of the emf in frame of reference δ-γ defined by the following relationships:

$$e_\delta = p\psi_f \Omega \sin \phi$$

$$e_\gamma = p\Omega\psi_f \sin \phi$$

Generally, to control the sensorless PMSM, components $e_\delta$, $e_\gamma$ of the emf are estimated in rotating estimated frame of reference δ-γ. If the latter coincides with frame of reference d-q associated with the rotor, the direct component of the emf in the rotating estimated frame of reference becomes zero. This gives a criterion which enables position $\vartheta$ and speed $\Omega_c$ of rotating estimated frame of reference δ-γ to be corrected in order that it can be synchronised with frame of reference d-q associated with the rotor. After this, the position and speed of the rotor can be deduced directly from the position and speed of estimated frame of reference δ-γ.

The problem of sensorless vector control can then be summarized by determining a control law defining angular speed $\Omega_c$ and the components of stator voltages $v_\delta$, $v_\gamma$ in frame of reference δ-γ which ensures that φ is constantly maintained at zero, and the components of currents $i_\delta$, $i_\gamma$ at their references $i_{\delta ref}$, $i_{\gamma ref}$ determined by reference torque $\Gamma_{ref}$.

FIG. 7 illustrates diagrammatically a sensorless control device.

This control device includes a torque-currents converter 137, vector control means 119, and a model of inverter-MSAF assembly 114 in frame of reference δ-γ.

Converter 137 accomplishes the transition from the torque to the current by transforming value of the reference torque (or set torque) $\Gamma_{ref}$ into the corresponding reference currents $i_{\delta ref}$, $i_{\gamma ref}$ in frame of reference δ-γ.

Vector control means 119 determine a control law to control inverter-MSAF assembly 114 whilst ensuring that φ is constantly maintained at zero ($\phi_f$=0). This control law defines angular speed $\Omega_c$ and the components of stator voltages $v_\delta$, $v_\gamma$ in frame of reference δ-γ as a function of the components of currents $i_\delta$, $i_\gamma$ obtained from the measurements of the back currents, and reference currents $i_{\delta ref}$, $i_{\gamma ref}$.

A sensorless control device is particularly robust, since it has one fewer detection elements. A sensorless control device is thus simpler to produce, and can have a longer lifetime than a control device with sensors.

However, a position sensor is generally very precise and, consequently, a control device using a position sensor can regulate the voltages of the inverter powering the MSAF with greater accuracy than a sensorless control device.

The purpose of the present invention is consequently to provide a device to control an MSAF having optimum reliability and which is extremely safe, which are major preoccupations in aeronautics.

ACCOUNT OF THE INVENTION

The present invention concerns a device for controlling a permanent magnet synchronous machine, "PMSM", including a stator and a rotor, and powered by an inverter, where the control device includes:
  a sensor to sample a measurement $\theta_m$ of the rotor position,
  control means to control an operating point of the PMSM as a function of the rotor position and of the predefined parameters,
  estimation means to determine an estimate $\hat{\theta}$ of the rotor position in an estimated Park frame of reference δ-γ associated with the rotor, where the said estimation means include adjustment means to make said estimated rotor position $\hat{\theta}$ track said measured rotor position $\theta_m$,
  a malfunction detector to detect a malfunction of the said sensor, and
  a switch configured to connect the control means to the sensor in order that the control means receive measured position $\theta_m$ of the rotor while the malfunction detector does not indicate any malfunction of the said sensor, and otherwise to connect the control means to the estimation means in order that the control means receive estimated position $\hat{\theta}$ of the rotor when the malfunction detector indicates a malfunction of the said sensor.

This enables the availability of the PMSM in degraded mode to be increased by ensuring that the machine operates satisfactorily in the event of a malfunction of the sensor. It will be noted that this device favours control of the PMSM with the measurement sampled by the sensor, and switches to sensorless control only when an anomaly of the sensor has been detected, whilst making it possible to avoid a substantial difference between the two positions at the moment when control with sensors switches to sensorless control.

Advantageously, the estimation means include:
  an electromotive force estimator to estimate components $\hat{e}_\delta$, $\hat{e}_\gamma$ of the electromotive force, "emf", in the estimated Park frame of reference δ-γ as a function of the magnitudes defined in the said Park frame of reference including current components $i_\delta$, $i_\gamma$ obtained from the measurements of the stator currents, the components of stator voltages $v_\delta$, $v_\gamma$ corresponding to the inverter's reference voltages, and a speed of rotation $\Omega_c$ of the rotor,
  a speed estimator using the said estimated components $\hat{e}_\delta$, $\hat{e}_\gamma$ of the emf obtained from the electromotive force estimator, and using a non-linear corrector to determine the rotational speed $\Omega_c$ according to a control law having an area of global convergence including a single point of asymptotically stable equilibrium equal to the PMSM's operating set point,
  an integrator using the rotational speed $\Omega_c$ taken from the speed estimator to calculate said estimate $\hat{\theta}$ of the rotor position.

The control device according to the invention thus enables the PMSM to be controlled in the event of a malfunction of the sensor according to a control law having an area of global convergence which restricts convergence to the single desired operating point whatever the rotor position relative to the stator.

According to one embodiment of the invention, the said speed estimator includes a first estimator configured to determine a prior estimate $\hat{\Omega}$ of the rotational speed according to estimated component $\hat{e}_\gamma$ of the emf associated with axis γ and a predetermined physical parameter $K_f$ depending on the characteristics of the rotor's permanent magnets, according to the following formula:

$$\hat{\Omega} = \frac{\hat{e}_\gamma}{K_f},$$

and in that the non-linear corrector is configured to regulate the rotational speed by introducing a term which corrects said estimated value $\hat{\Omega}$ of the rotational speed according to the following formula:

$$\Omega_c = \frac{\hat{e}_\gamma}{K_f} - \frac{b}{K_f} \text{sign}(\hat{\Omega}) \cdot K \cdot \hat{e}_\delta$$

where b is a predetermined operational setting, sign($\hat{\Omega}$) is the sign of said estimated value $\hat{\Omega}$ of the rotational speed, $\hat{e}_\delta$ is the emf associated with axis δ, and where K is a non-linear factor which depends on the sign of the emf $\hat{e}_\delta$ associated with axis δ and on a coefficient ξ predetermined by means of the following formula and conditions:

$K = 1\xi \cdot \text{sign}(\hat{e}_\delta)$ where 0<ξ<1 and $$\frac{1}{1+\xi} < b < \frac{1}{1-\xi}.$$

Thus, the non-linear corrector allows the rotor's real frame of reference to be approached by constantly maintaining electromotive force $e_\delta$ associated with axis δ at zero, by making all undesired operating points unstable. This causes a rapid convergence towards the desired operating point, whilst allowing a reversal of the rotational speed.

The said adjustment means are configured to execute a PI between measured rotor position $\theta_m$ and estimated rotor position $\hat{\theta}$.

The adjustment means can advantageously include inhibition means to inhibit the adjustment means when a malfunction of the said sensor is detected.

If a malfunction is detected the correction made by the adjustment means is advantageously inhibited, since measured rotor position $\theta_m$ is probably false.

Advantageously, the said estimation means include initialization means to reinitialize estimated rotor position $\hat{\theta}$ with a last rotor position estimate $\hat{\theta}_0$ before the detection of a malfunction of the sensor.

This enables transitional oscillations to be prevented, and the torque value to be kept constant when control with sensors is switched to sensorless control.

The invention also covers a permanent magnet synchronous machine PMSM including a control device having the above characteristics.

The invention also covers an actuator in an aircraft including a PMSM having the above characteristics.

The invention also concerns a method for controlling a permanent magnet synchronous machine, "PMSM", including a stator and a rotor, and powered by an inverter, where the control method includes the following steps:

measuring by means of a sensor a position $\theta_m$ of the rotor, and checking an operating point of the PMSM as a function of the rotor position and the predefined parameters, determining an estimate $\hat{\theta}$ of the rotor position in an estimated Park frame of reference $\delta$-$\gamma$ associated with the rotor, make said estimated rotor position $\hat{\theta}$ track said measured rotor position $\theta_m$, detecting a malfunction of the said sensor, and checking the operating point of the PMSM according to measured rotor position $\theta_m$ whilst the sensor is not malfunctioning, and otherwise checking the operating point of the PMSM as a function of estimated rotor position $\hat{\theta}$ when the sensor is malfunctioning.

The control method may also include the following steps:

estimating components $\hat{e}_\delta$, $\hat{e}_\delta$ of the electromotive force, "emf", in the estimated Park frame of reference $\delta$-$\gamma$ as a function of the magnitudes defined in the said Park frame of reference including components of currents $i_\delta$, $i_\gamma$ obtained from the measurements of the stator currents, components of stator voltages $v_\delta$, $v_\gamma$ corresponding to the inverter's reference voltages, and a speed of rotation $\Omega_c$ of the rotor, estimating rotational speed $\Omega_c$ as a function of said estimated components $\hat{e}_\delta$, $\hat{e}_\gamma$ of the emf and using a non-linear corrector according to a control law having an area of global convergence including a single point of asymptotically stable equilibrium equal to the PMSM's operating set point, calculating said estimated rotor position $\hat{\theta}$ as a function of rotational speed $\Omega_c$.

The control method may also include the following steps:

determining prior estimate $\hat{\Omega}$ of the rotational speed as a function of estimated component $\hat{e}_\gamma$ of the emf associated with axis $\gamma$ and a predetermined physical parameter $K_f$ depending on the characteristics of the rotor's permanent magnets, according to the following formula:

$$\hat{\Omega} = \frac{\hat{e}_\gamma}{K_f},$$

regulating the rotational speed by introducing a corrective term to said estimated value $\hat{\Omega}$ of the rotational speed according to the following formula:

$$\Omega_c = \frac{\hat{e}_\gamma}{K_f} - \frac{b}{K_f} \text{sign}(\hat{\Omega}) \cdot K \cdot \hat{e}_\delta$$

where b is a predetermined operational setting, $\text{sign}(\hat{\Omega})$ is the sign of said estimated value $\hat{\Omega}$ of the rotational speed, $\hat{e}_\delta$ is the emf associated with axis $\delta$, and where K is a non-linear factor which depends on the sign of the emf $\hat{e}_\delta$ associated with axis $\delta$ and on a coefficient $\xi$ predetermined by means of the following formula and conditions:

$K = 1 - \xi \cdot \text{sign}(\hat{e}_\delta)$ with $0 < \xi < 1$ and $$\frac{1}{1+\xi} < b < \frac{1}{1-\xi}.$$

The invention also covers a computer program including instructions for the implementation of the above control method.

BRIEF DESCRIPTION OF THE ILLUSTRATIONS

Other characteristics and advantages of the invention will appear on reading the preferential embodiments of the invention made in reference to the attached figures, among which:

DETAILED ACCOUNT OF PARTICULAR EMBODIMENTS

Figure 1:
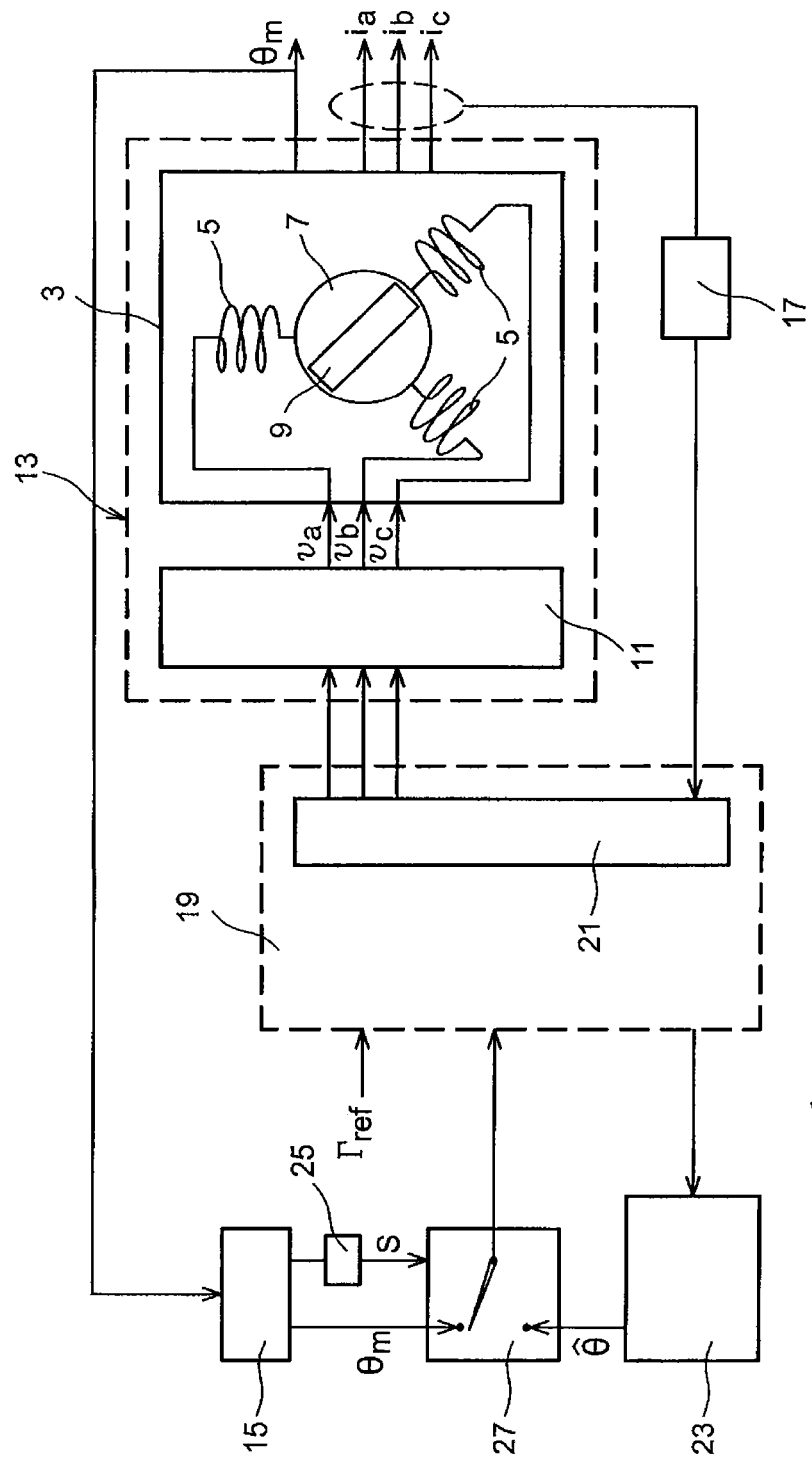
FIG. 1 represents diagrammatically a permanent magnet synchronous machine "PMSM", according to the invention.

FIG. 1 represents diagrammatically a device 1 to control a permanent magnet synchronous machine or "PMSM" 3, according to the invention.

PMSM machine 3 habitually includes stator windings 5 connected in a star shape with isolated power and a rotor 7 with permanent magnets 9 of symmetrical constitution with p pairs of poles (of which a single pair is represented here p=1).

PMSM 3 is powered by an inverter 11 which imposes voltages $v_a$, $v_b$, $v_c$, at the terminals of stator windings 5. The inverter-PMSM assembly according to a triphase model is represented in simplified form by block 13.

Control device 1 includes a position sensor 15, electrical measuring means 17, and control means 19.

Position sensor 15 is a resolver (for example, a Hall effect sensor, or any other type of resolver) installed on PMSM 3 to sample accurately measurement $\theta_m$ of rotor position 7. The position can, of course, also be determined indirectly by measuring the speed of rotation of the rotor instead of its position. In this case the position sensor can include means to measure the rotational speed, and an integrator to determine the position.

Electrical measurement means 17 are configured to measure electrical feedback data and, more specifically, to measure stator currents $i_a$, $i_b$, $i_c$ of PMSM 3.

Means of control 19 receive signals concerning the rotor position, signals concerning stator currents $i_a$, $i_b$, $i_c$ measured by electrical measurement means 17, and data concerning reference torque $\Gamma_{ref}$ and/or reference rotation $\Omega_{ref}$.

Control means 19 include a transformation interface 21 between the triphase model of inverter-PMSM assembly 13 and a two-phase model in a Park frame of reference. This transformation enables the physical magnitudes of a triphase model to be transformed to a two-phase model, and vice versa, according to the position of rotor 7.

Thus, control means 19 can control or inspect the operating point of PMSM 3 (i.e. the operating point desired or set by reference torque $\Gamma_{ref}$ and/or reference rotation $\Omega_{ref}$) as a function of the position of rotor 9, the predefined parameters ($\Gamma_{ref}$ and/or $\Omega_{ref}$), and the electrical feedback data.

In accordance with the invention, control device also includes estimation means 23, a malfunction detector 25 and a transition switch 27.

Estimation means 23 are configured to determine an estimated position $\hat{\theta}$ of rotor 7 in estimated Park reference frame δ-γ. As will be seen in greater detail below with reference to FIG. 2, this estimate can be made by correcting position $\vartheta$ of estimated rotating frame of reference δ-γ such that it is synchronised with frame of reference d-q associated with the rotor (see also FIG. 6).

Malfunction detector 25 is configured to detect a possible malfunction of sensor 15. In particular, malfunction detector 25 can, for example, consist of a malfunction signal which is generated or delivered by sensor 15 itself when it malfunctions.

Switch 27 is configured to connect control means 19 either to estimation means 23, or to position sensor 15, depending on whether malfunction signal S does or does not indicate that sensor 15 is malfunctioning.

More specifically, while the malfunction detector does not indicate any malfunction of position sensor 15, switch 27 maintains the connection between control means 19 and position sensor 15, in order that control means 19 receive measured position $\theta_m$ of rotor 7. Conversely, when the malfunction detector indicates that position sensor 15 is malfunctioning, switch 27 then connects control means 19 to estimation means 23, in order that control means 19 receive estimated position $\hat{\theta}$ of rotor 7.

Thus, as soon as sensor 15 malfunctions, switch allows a transition from control using sensors to sensorless control of PMSM 3. This enables the availability of PMSM 3 in degraded mode to be increased. Naturally, as soon as position sensor 15 is repaired PMSM 3 can once again be controlled with position sensor 15.

It will be noted that FIG. 1 and FIGS. 2-4B are also illustrations of the main steps of the control method according to the invention.

Figure 2:
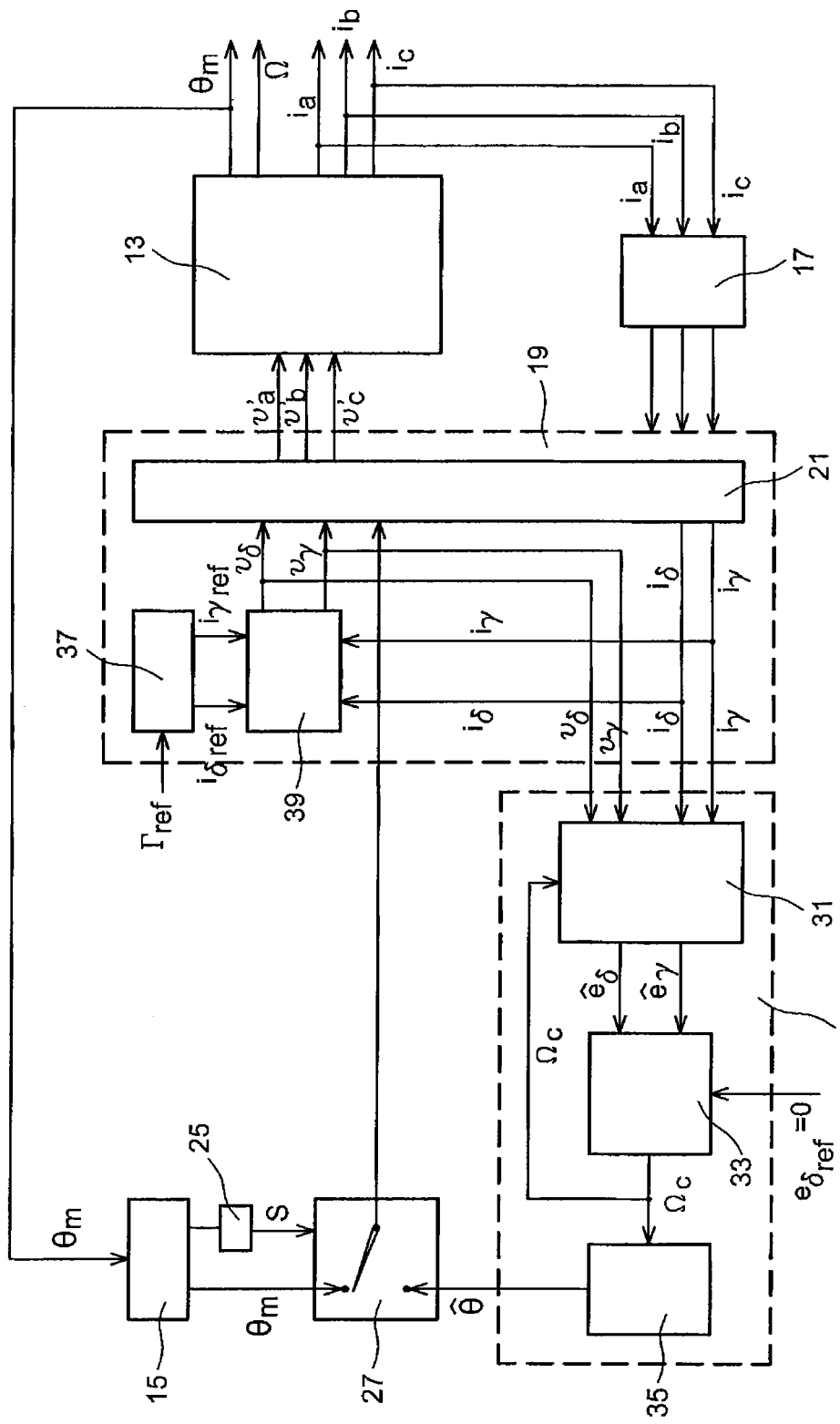
FIG. 2 represents diagrammatically an embodiment of the control device of FIG. 1.

FIG. 2 illustrates an embodiment of the control device of FIG. 1.

This diagram shows that estimation means 23 include an electromotive force estimator 31, a speed estimator 33, and an integrator 35. In addition, control means 19 include a torque-current converter 37 and current regulator 39 in addition to transformation interface 21.

Torque-current converter 37 transforms the value of reference torque $\Gamma_{ref}$ into the corresponding reference currents $i_{\delta ref}$, $i_{\gamma ref}$ in estimated Park frame of reference δ-γ.

In addition, transformation interface 21 transforms stator currents $i_a$, $i_b$, $i_c$ measured by electrical measurement means 17 into components of currents $i_\delta$, $i_\gamma$ in Park frame of reference δ-γ.

In addition, current regulator 39 receives reference currents $i_{\delta ref}$, $i_{\gamma ref}$ from torque-current converter 37 and current components $i_\delta$, $i_\gamma$ in frame of reference δ-γ from transformation interface 21 to determine the components of stator voltages $v_\delta$, $v_\gamma$ in frame of reference δ-γ corresponding to the reference voltages of inverter 11. Transformation interface 21 receives these components of stator voltages $v_\delta$, $v_\gamma$ according to the two-phase model, and transforms them into reference voltages $v'_a$, $v'_b$, $v'_c$ of inverter 11 according to the triphase model.

Figure 6:
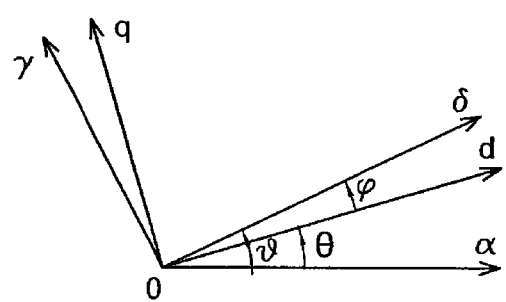
FIG. 6 represents a Park frame of reference associated with the rotor of a PMSM.
Figure 7:
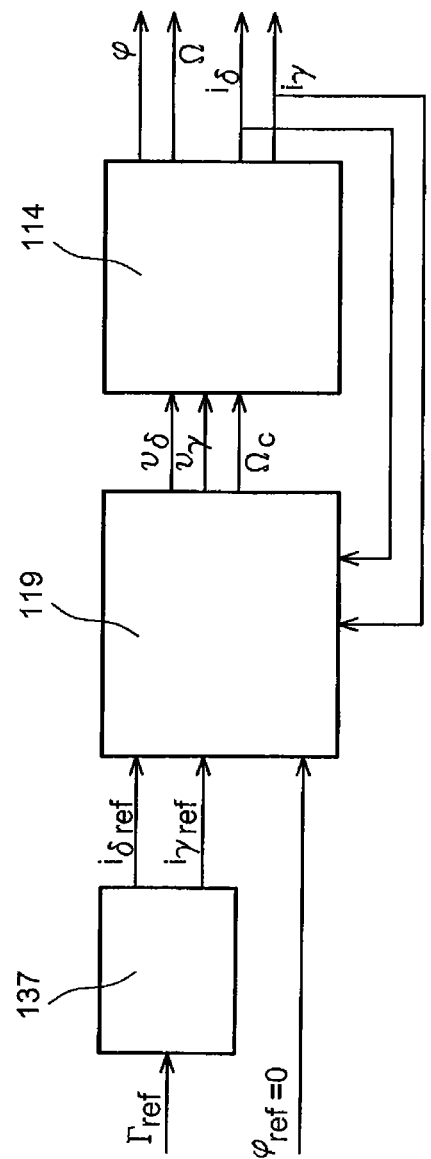
FIG. 7 represents diagrammatically a device to control a sensorless PMSM, according to the prior art.

Sensorless vector control consists in estimating angular speed $\Omega_c$ such that difference of position φ between $\vartheta$ and θ is cancelled out (see FIG. 6). In other words, angular speed $\Omega_c$ must be obtained from a control law guaranteeing that position error φ is constantly maintained at zero (2π modulo).

However, given that component $e_\delta$ of the emf in axis δ tends towards zero when φ tends towards zero ($e_\delta = p\psi_f\Omega \sin\phi$), constant maintenance of position difference φ at zero can be replaced by constant maintenance of $e_\delta$ at zero.

This estimate consists in resolving the following electrical equations in estimated frame of reference δ-γ:

$$\hat{e}_\delta = -Ri_\delta - L\frac{di_\delta}{dt} - p\Omega_c Li_\gamma + v_\delta$$

$$\hat{e}_\gamma = -Ri_\gamma - L\frac{di_\gamma}{dt} - p\Omega_c Li_\delta + v_\gamma$$

Consequently, electromotive force estimator 31 receives the components of currents $i_\delta$, $i_\gamma$ from transformation interface 21, the components of stator voltages $v_\delta$, $v_\gamma$ from current regulator 39, and speed of rotation $\Omega_c$ of the rotor from speed estimator 33, in order to estimate, as a function of these magnitudes, components $\hat{e}_\delta$, $\hat{e}_\gamma$ of the emf in estimated frame of reference δ-γ.

Speed of rotation $\Omega_c$ of the rotor is estimated in a closed loop by speed estimator 33 according to estimates $\hat{e}_\delta$, $\hat{e}_\gamma$ of the emf determined by electromotive force estimator 31, and by maintaining component $\hat{e}_\delta$ constantly at zero. Speed of rotation $\Omega_c$ of the rotor is naturally initialized by a predetermined initial value $\Omega_{c0}$.

Advantageously, speed estimator 31 uses a non-linear corrector to determine rotational speed $\Omega_c$ according to a control law having an area of global convergence including a single point of asymptotically stable equilibrium in the Lyapunov sense. This point of equilibrium is equal to the operating set point of MSAF 3.

Figure 3:
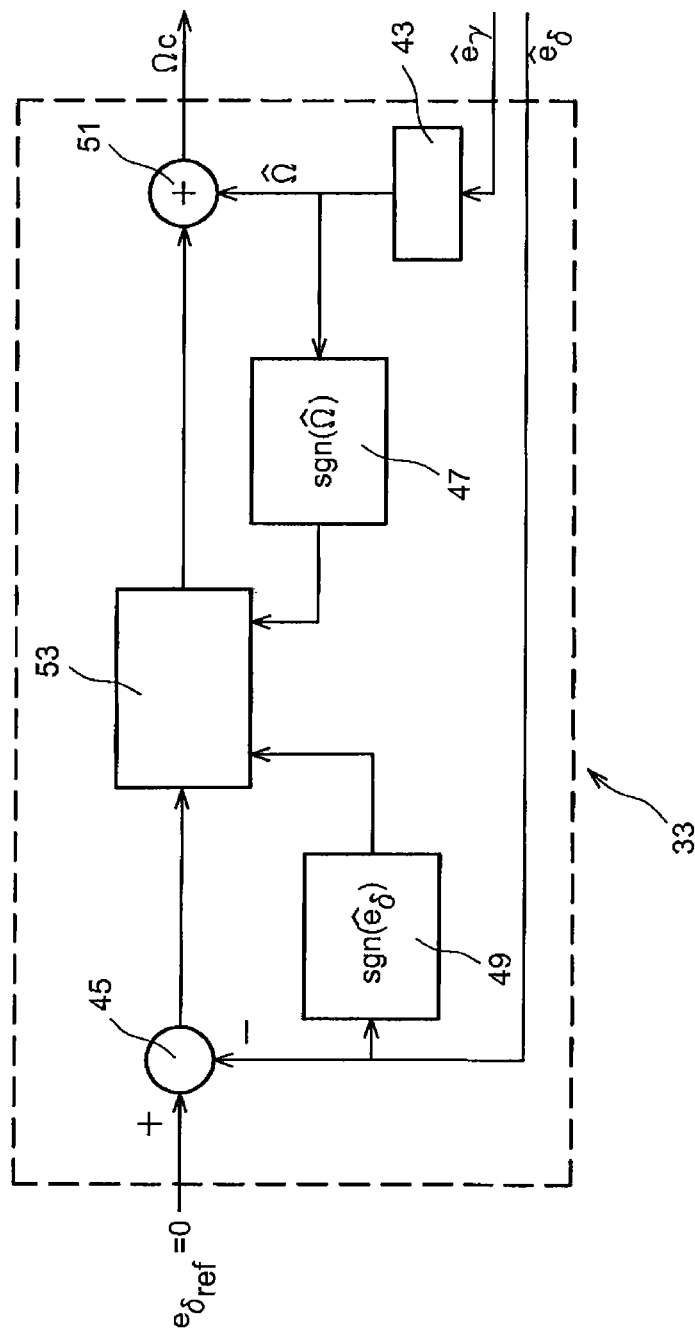
FIG. 3 represents diagrammatically an embodiment of the speed estimator illustrated in FIG. 2.

FIG. 3 illustrates an embodiment of speed estimator 33.

According to this example, the functional diagram of speed estimator 33 includes a first speed estimator 43, a comparator 45, first and second sign indicators 47 and 49, an adder 51, and a non-linear corrector 53.

The purpose of comparator 45 is to compare component $\hat{e}_\delta$ with its reference component $e_{\delta ref}=0$. The purpose of first speed estimator 43 is to determine a prior estimate $\hat{\Omega}$ of the rotational speed according to estimated component $\hat{e}_\gamma$. The purpose of first sign indicator 47 is to indicate the sign of prior estimate $\hat{\Omega}$ of the rotational speed, if it is assumed that sign $(\hat{\Omega})=\text{sign}(\hat{\Omega}_{ref})$, where $\Omega_{ref}$ is the set rotational speed. The purpose of second sign indicator 49 is to indicate the sign of component $\hat{e}_\delta$. The purpose of non-linear corrector 53 is to introduce non-linear terms in order to make all undesired points of convergence of the control law unstable, or to prevent convergence to any undesired solutions. Finally, the purpose of adder 51 is to add the non-linear terms to prior estimate $\hat{\Omega}$ in order to determine rotational speed $\hat{\Omega}_c$.

First speed estimator 43 calculates the quotient between component of emf $\hat{e}_\gamma$ associated with axis $\gamma$ and a predetermined physical parameter $K_f$ depending on the characteristics of the rotor's permanent magnets, using the following formula:

$$\hat{\Omega} = \frac{\hat{e}_\gamma}{K_f}$$

where $K_f = p\psi_f$.

According to a particular embodiment, non-linear corrector 53 introduces a corrective term which is a function of sign sign($\hat{\Omega}$) of prior estimate $\hat{\Omega}$ of the rotational speed, of a predetermined operating parameter b, physical parameter $K_f$, component $\hat{e}_\delta$ of the emf associated with axis $\delta$, and finally a non-linear factor which depends on the sign of component $\hat{e}_\delta$ and a predetermined coefficient $\xi$ using the following formula:

$$-\frac{b}{K_f}\text{sign}(\hat{\Omega}) \cdot K \cdot \hat{e}_\delta$$

and $K=1-\xi\cdot\text{sign}(\hat{e}_\delta)$.

Adder 51 then adds the above corrective term to prior estimate $\hat{\Omega}$ in order to determine rotational speed $\Omega_c$ using the following formula:

$$\Omega_c = \frac{\hat{e}_\gamma}{K_f} - \frac{b}{K_f}\text{sign}(\hat{\Omega}) \cdot K \cdot \hat{e}_\delta$$

It will be noted that by analysing the stability of the control law expressed by rotational speed $\Omega_c$ using the above formula (see the publication of Babak Nahid-Mobarakeh et al., "*Analysis of convergence of sensorless control laws of PMSMs based on estimation of the emf,*"), it can be seen that all the trajectories in phase space $\phi$-$\Omega$ converge towards the desired point of equilibrium ($\phi=0$, $\Omega=\Omega_{ref}$) for the following conditions:

$0<\xi<1$ and $$\frac{1}{1+\xi} < b < \frac{1}{1-\xi}.$$

Operational parameter b is advantageously between 0 and 3 ($0<b\leq3$) and preferably close to 1.

The above control law enables all trajectories in phase space to be prevented from converging towards all undesired points of equilibrium by making certain points of equilibrium unstable, and moving the other points in phase space far enough away to prevent them. This in particular enables the problem of non-observability inherent to electrical equations at a rotational speed close to zero to be overcome.

Moreover, the dependence of the corrective term on the sign of rotational speed sign($\hat{\Omega}$) enables the trajectories in phase space $\phi$-$\Omega$ to converge towards the desired point, whatever the sign of set rotational speed $\Omega_{ref}$, allowing speed reversal without any problem.

Thus, with the above conditions, whatever the initial coordinate point ($-\pi\leq\phi\leq\pi$, $\Omega=\Omega_0$), all trajectories in phase space $\phi$-$\Omega$ converge towards the desired point of equilibrium.

In other words, even if at the start the initial position error is of the order of $\pi$, the trajectory rapidly converges towards the operating point using the set torque and rotational speed values.

In addition, even if at start-up the initial point has a rotational speed of the sign opposite the set speed, the position error rapidly converges towards zero, enabling the PMSM rapidly to attain a permanent speed equal to the set torque and rotational speed values.

When the rotational speed has been determined by speed estimator 33, integrator 35 integrates rotational speed $\Omega_c$ from speed estimator 33 to determine estimated rotor position $\hat{\theta}$.

Furthermore, in order to enable uniform and accurate transition between control with sensors and sensorless control, estimation means 23 can include means to adjust estimated rotor position $\hat{\theta}$ continuously.

Figure 4A:
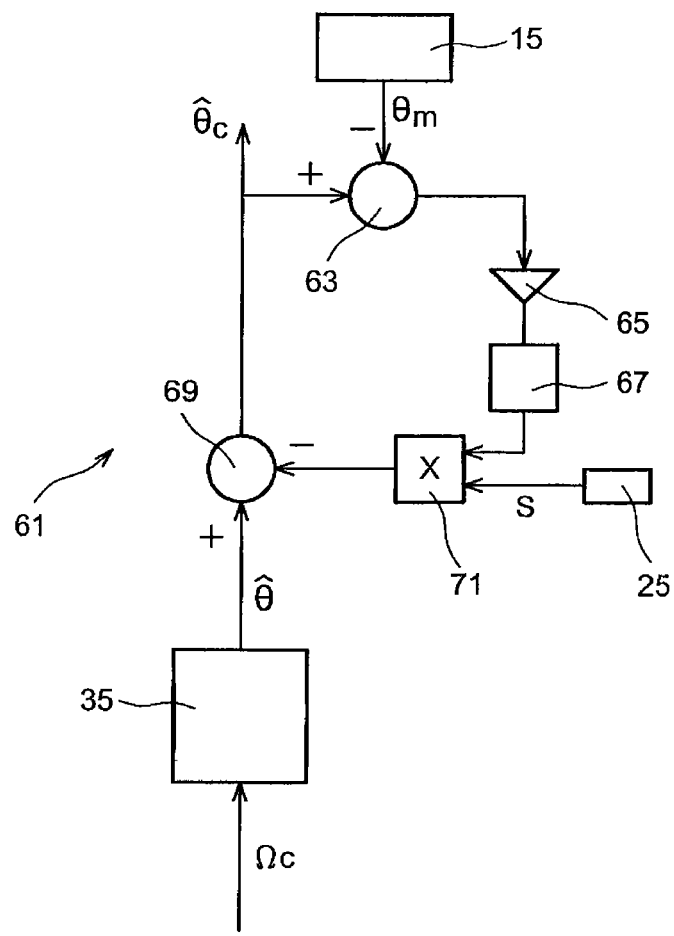
FIGS. 4A and 4B represent diagrammatically particular embodiments of the adjustment means illustrated in FIGS. 1 and 2.

FIG. 4A shows adjustment means 61 which can be included in estimation means 23. These adjustment means 61 are configured to execute a PI on the difference between measured rotor position $\theta_m$ and estimated rotor position $\hat{\theta}$ in order to make the latter track measured rotor position $\theta_m$.

Adjustment means 61 can thus include a position comparator 63 to compare rapidly rotor position $\theta_m$ measured by position sensor 15 with estimated rotor position $\hat{\theta}$ from integrator 35, a PI filter or gain multiplier 65 to accomplish a counter-reaction in order that the integration does not diverge and an additional integrator 67 to synchronise estimated rotor position $\hat{\theta}$ with measured rotor position $\hat{\theta}_m$ and a second comparator 69 between the output of additional integrator 67 and estimated rotor position $\hat{\theta}$ to correct $\hat{\theta}_c$ the rotor position.

It will be noted that the comparison and the counter-reaction occur continuously to prevent estimated value $\hat{\theta}$ of the rotor position from diverging since, while position sensor 15 is in use, estimated value $\hat{\theta}$ would be in an open loop. When a malfunction of position sensor 15 is detected the last estimated value of rotational speed $\Omega_c$ from speed estimator 33 at that time is injected in integrator 35 at the moment when the control is switched over.

Consequently, if a switchover does indeed occur, between control with sensors and sensorless control, the difference between the last measured value $\hat{\theta}_m$ and estimated value $\hat{\theta}$ is advantageously very small.

After the transition has occurred there is no requirement for the counter-reaction as the value of position sensor 15 is incorrect.

Indeed, FIG. 4A shows that adjustment means 61 include inhibition means 71 to inhibit adjustment means 61 when malfunction detector 25 indicates a malfunction of position sensor 15. These inhibition means 71 can very simply include a multiplier which calculates the product of malfunction signal S and the correction of the rotor position delivered by additional integrator 67. Thus, when a malfunction is detected the malfunction signal is equal to zero (S=0) and therefore the output of inhibition means 71 is set to zero, which enables last measured value $\theta_m$ of the rotor position to be inhibited or to be disregarded. Conversely, while the malfunction signal indicates no anomaly of the sensor (S=1), the adjustment means use measured values $\theta_m$ of the rotor position.

Figure 4B:
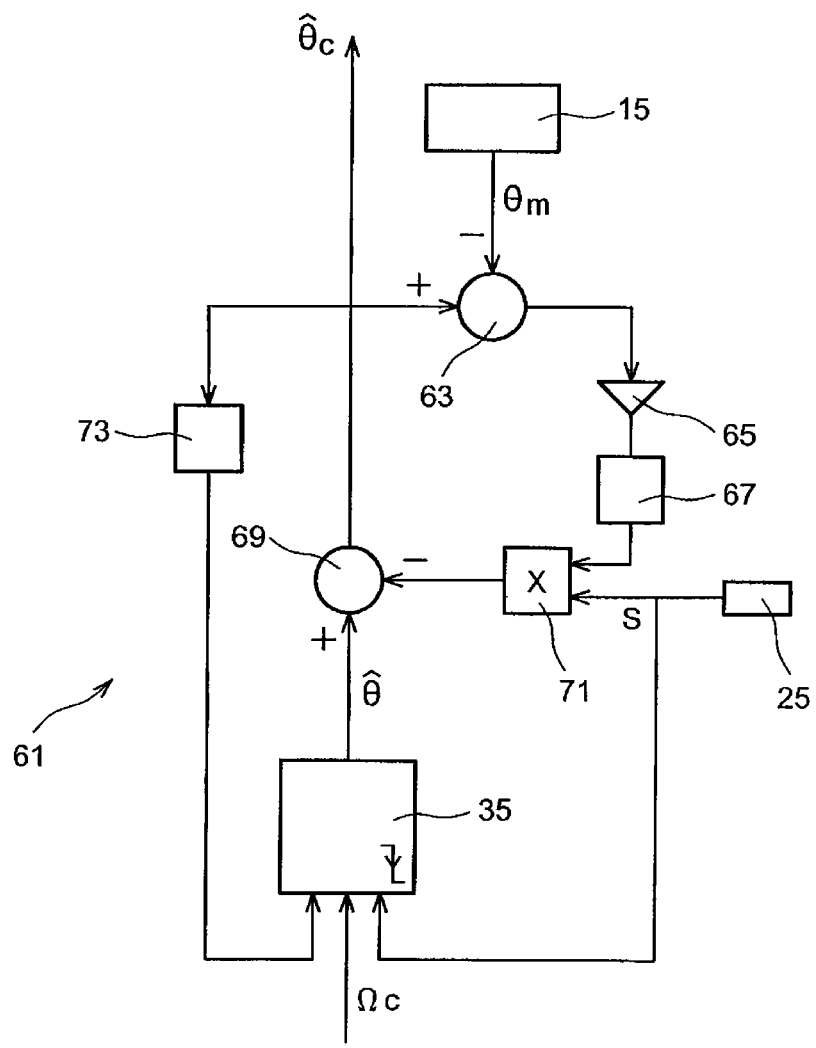
Figure 5:
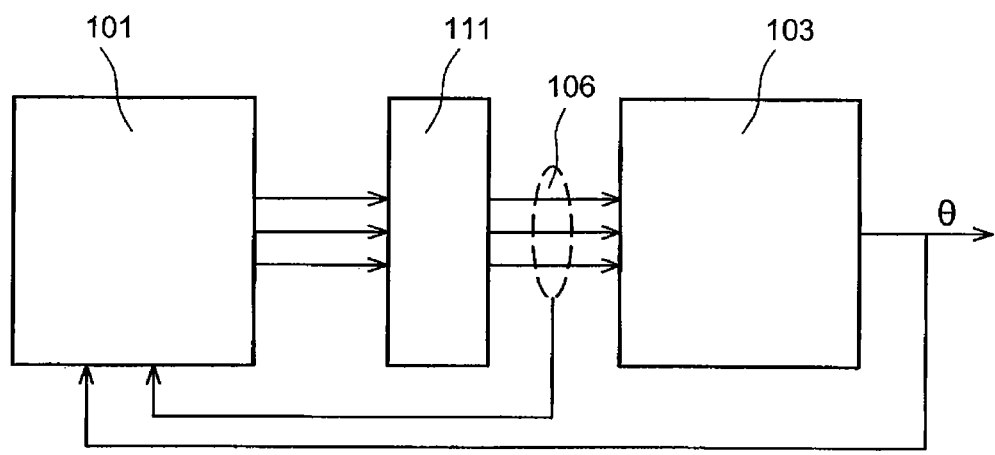
FIG. 5 represents diagrammatically a device to control a PMSM, according to the prior art.

FIG. 4B shows that estimation means 23 can also include initialization means 73 to reinitialize estimated rotor position $\hat{\theta}$ with the last estimate $\hat{\theta}_0$ before the detection of a malfunction of position sensor 15.

Initialisation means 73 include a memory to record the last value of the rotor position (estimated $\hat{\theta}$ or corrected $\hat{\theta}_c$) which is still correct.

Indeed, when a malfunction is detected malfunction signal S activates a trigger on, for example, a falling signal which results in the integration being reinitialised by the last estimated rotor position $\hat{\theta}_o$.

Thus, at the time of the switch between control with sensors and sensorless control the torque at the time of the transient state between the two forms of control has no oscillations.

It will be noted that the different elements of the control device can include processing or calculation means having one or more computer programs including code instructions for implementing the control method according to the invention when the computer program or programs are executed by these various elements.

Consequently, the invention also covers a computer program product which can be implemented in the different elements of the control device, where this program includes code instructions able to implement a method according to the invention as described above.

The system including the PMSM and control of it according to the invention can advantageously be used in actuator motors in on-board aircraft systems. As an example, it can be used in the compressor, ventilation system, thrust reversers, doors and many other types of aircraft equipment.

The invention claimed is:

1. A device to control a permanent magnet synchronous machine, "PMSM", including a stator and a rotor and powered by an inverter, comprising:
   a sensor to sample a measurement $\theta_m$ of the position of the rotor;
   control means to control an operating point of the PMSM according to the position of the rotor and the settings;
   estimation means to determine an estimate $\hat{\theta}$ of the rotor position in an estimated Park frame of reference δ-γ associated with the rotor, where the estimation means include adjustment means to make said estimated rotor position $\hat{\theta}$ track said measured rotor position $\theta_m$;
   a malfunction detector to detect a malfunction of the sensor; and
   a switch configured to connect the control means to the sensor in order that the control means receive measured position $\theta_m$ of the rotor while the malfunction detector does not indicate any malfunction of the sensor, and otherwise to connect the control means to the estimation means in order that the control means receive estimated position $\hat{\theta}$ of the rotor when the malfunction detector indicates a malfunction of the sensor.

2. The control device according to claim 1, wherein the estimation means include:
   an electromotive force estimator to estimate components $\hat{e}_\delta$, $\hat{e}_\gamma$ of the electromotive force "emf" in the estimated Park frame of reference δ-γ as a function of the magnitudes defined in the Park frame of reference including current components $i_\delta$, $i_\gamma$ obtained from the measurements of the stator currents, the components of stator voltages $v_\delta$, $v_\gamma$ corresponding to the inverter's reference voltages, and a speed of rotation $\Omega_c$ of the rotor,
   a speed estimator using said estimated components $\hat{e}_\delta$, $\hat{e}_\gamma$ of the emf obtained from the electromotive force estimator, and using a non-linear corrector to determine the rotational speed $\Omega_c$ according to a control law having an area of global convergence including a single point of asymptotically stable equilibrium equal to the PMSM's operating set point, and
   an integrator using the rotational speed $\Omega_c$ taken from the speed estimator to calculate said estimate $\hat{\theta}$ of the rotor position.

3. The control device according to claim 2, wherein the speed estimator includes a first estimator configured to determine a prior estimate $\hat{\Omega}$ of the rotational speed according to estimated component $\hat{e}_\gamma$ of the emf associated with axis γ and a predetermined physical parameter $K_f$ depending on the characteristics of the rotor's permanent magnets, according to the following formula:

$$\hat{\Omega} = \frac{\hat{e}_\gamma}{K_f},$$

and in that the non-linear corrector is configured to regulate the rotational speed by introducing a term which corrects said estimated value $\hat{\Omega}$ of the rotational speed according to the following formula:

$$\Omega_c = \frac{\hat{e}_\gamma}{K_f} - \frac{b}{K_f} \text{sign}(\hat{\Omega}) \cdot K \cdot \hat{e}_\delta$$

where b is a predetermined operational setting, $\text{sign}(\hat{\Omega})$ is the sign of said estimated value $\hat{\Omega}$ of the rotational speed, $\hat{e}_\delta$ is the emf associated with axis δ, and where K is a non-linear factor which depends on the sign of the emf $\hat{e}_\delta$ associated with axis δ and on a coefficient ξ predetermined by means of the following formula and conditions:

$K=1-\xi\cdot\text{sign}(\hat{e}_\delta)$ with $0<\xi<1$ and $$\frac{1}{1+\xi} < b < \frac{1}{1-\xi}.$$

4. The control device according to claim 1, wherein the adjustment means are configured to accomplish a PI between measured rotor position $\theta_m$ and estimated rotor position $\hat{\theta}$.

5. The control device according to claim 1, wherein the adjustment means include a means of inhibition to inhibit the adjustment means when a malfunction of the sensor is detected.

6. The control device according to claim 1, wherein the estimation means include initialization means to reinitialize estimated rotor position $\hat{\theta}$ with a last rotor position estimate $\hat{\theta}_0$ before the detection of a malfunction of the sensor.

7. A permanent magnet synchronous machine PMSM, comprising a control device according to claim 1.

8. An actuator in an aircraft, comprising a PMSM according to claim 7.

9. A method for controlling a permanent magnet synchronous machine, "PMSM", including a stator and a rotor, and powered by an inverter, comprising:
measuring by means of a sensor a position $\theta_m$ of the rotor;
checking an operating point of the PMSM as a function of the rotor position and the predefined parameters;
determining an estimate $\hat{\theta}$ of the rotor position in an estimated Park frame of reference $\delta$-$\gamma$ associated with the rotor;
making said estimated rotor position $\hat{\theta}$ track said measured rotor position $\theta_m$;
detecting a malfunction of the sensor; and
checking the operating point of the PMSM according to measured rotor position $\theta_m$ while the sensor is not malfunctioning, and otherwise checking the operating point of the PMSM as a function of estimated rotor position $\hat{\theta}$ when the sensor is malfunctioning.

10. The control method according to claim 9, further comprising:
estimating components $\hat{e}_\delta$, $\hat{e}_\gamma$ of the electromotive force "emf" in the estimated Park frame of reference $\delta$-$\gamma$ as a function of the magnitudes defined in the Park frame of reference including components of currents $i_\delta$, $i_\gamma$ obtained from measurements of the stator currents, components of stator voltages $v_0$, $v_\gamma$ corresponding to the inverter's reference voltages, and a speed of rotation $\Omega_c$ of the rotor,
estimating rotational speed $\Omega_c$ as a function of said estimated components $\hat{e}_\delta$, $\hat{e}_\gamma$ of the emf and using a non-linear corrector according to a control law having an area of global convergence including a single point of asymptotically stable equilibrium equal to the PMSM's operating set point, and
calculating said estimated rotor position $\hat{\theta}$ as a function of rotational speed $\Omega_c$.

11. The control method according to claim 10, further comprising:
determining prior estimate $\hat{\Omega}$ of the rotational speed as a function of estimated component $\hat{e}_\gamma$ of the emf associated with axis $\gamma$ and a predetermined physical parameter $K_f$ depending on the characteristics of the rotor's permanent magnets, according to the following formula:

$$\hat{\Omega} = \frac{\hat{e}_\gamma}{K_f},$$

regulating the rotational speed by introducing a corrective term to said estimated value $\hat{\Omega}$ of the rotational speed according to the following formula:

$$\Omega_c = \frac{\hat{e}_\gamma}{K_f} - \frac{b}{K_f} \text{sign}(\hat{\Omega}) \cdot K \cdot \hat{e}_\delta$$

where b is a predetermined operational setting, $\text{sign}(\hat{\Omega})$ is the sign of said estimated value $\hat{\Omega}$ of the rotational speed, $\hat{e}_\delta$ is the emf associated with axis $\delta$, and where K is a non-linear factor which depends on the sign of the emf $\hat{e}_\delta$ associated with axis $\delta$ and on a coefficient $\xi$ predetermined by means of the following formula and conditions:

$K = 1 - \xi \cdot \text{sign}(\hat{e}_\delta)$ with $0 < \xi < 1$ and $$\frac{1}{1+\xi} < b < \frac{1}{1-\xi}.$$

12. A computer program including code instructions for implementing the control method according to claim 9 when it is executed by processing means.

* * * * *